US012624230B2

(12) United States Patent
Araki et al.

(10) Patent No.: US 12,624,230 B2
(45) Date of Patent: May 12, 2026

(54) WATER-BORNE LUSTER COATING COMPOSITION AND COATED PLATE

(71) Applicant: NIPPON PAINT AUTOMOTIVE COATINGS CO., LTD., Osaka (JP)

(72) Inventors: Yoshito Araki, Hirakata (JP); Hiroshi Kiyonaga, Hirakata (JP); Eiji Yamanaka, Hirakata (JP)

(73) Assignee: NIPPON PAINT AUTOMOTIVE COATINGS CO., LTD., Osaka (JP)

( * ) Notice: Subject to any disclaimer, the term of this patent is extended or adjusted under 35 U.S.C. 154(b) by 204 days.

(21) Appl. No.: 18/564,354

(22) PCT Filed: Jun. 10, 2022

(86) PCT No.: PCT/JP2022/023394
§ 371 (c)(1),
(2) Date: Nov. 27, 2023

(87) PCT Pub. No.: WO2023/276607
PCT Pub. Date: Jan. 5, 2023

(65) Prior Publication Data

US 2024/0263024 A1 Aug. 8, 2024

(30) Foreign Application Priority Data

Jun. 28, 2021 (JP) ................................ 2021-106997

(51) Int. Cl.
*C09D 5/36* (2006.01)
*C09D 7/40* (2018.01)
*C09D 7/61* (2018.01)
*C09D 7/63* (2018.01)
*C09D 7/65* (2018.01)
*C09D 101/10* (2006.01)

(52) U.S. Cl.
CPC ................. *C09D 5/36* (2013.01); *C09D 7/61* (2018.01); *C09D 7/63* (2018.01); *C09D 7/65* (2018.01); *C09D 7/70* (2018.01); *C09D 101/10* (2013.01)

(58) Field of Classification Search
None
See application file for complete search history.

(56) References Cited

U.S. PATENT DOCUMENTS

| | | | |
|---|---|---|---|
| 2019/0308217 A1 | 10/2019 | Okazaki et al. | |
| 2019/0380217 A1 | 12/2019 | Cosgrove et al. | |
| 2020/0238333 A1* | 7/2020 | Itoh ...................... | C09D 17/001 |
| 2022/0348773 A1 | 11/2022 | Sakai et al. | |

FOREIGN PATENT DOCUMENTS

| | | |
|---|---|---|
| EP | 4 190 458 | 6/2023 |
| JP | 60-144374 | 7/1985 |
| JP | 2003-119417 | 4/2003 |
| JP | 2005-120249 | 5/2005 |
| JP | 2009-155537 | 7/2009 |
| JP | 2014-25062 | 2/2014 |
| WO | 2017/175468 | 10/2017 |
| WO | 2018/012014 | 1/2018 |
| WO | 2021/002196 | 1/2021 |
| WO | 2022/025070 | 2/2022 |

OTHER PUBLICATIONS

International Preliminary Report on Patentability and Written Opinion issued Dec. 14, 2023 in corresponding International (PCT) Patent Application No. PCT/JP2022/023394.
International Search Report (ISR) issued Aug. 16, 2022 in International (PCT) Application No. PCT/JP2022/023394.
Japanese Office Action issued Sep. 5, 2023 in corresponding Japanese Patent Application No. 2021-106997, together with Machine English translation thereof.
Extended European Search Report issued May 19, 2025 in corresponding European Patent Application No. 22832764.9.

* cited by examiner

*Primary Examiner* — Sheeba Ahmed
(74) *Attorney, Agent, or Firm* — Wenderoth, Lind & Ponack, L.L.P.

(57) ABSTRACT

Provided are a water-borne luster coating composition and a coated plate which can exhibit a metallic design and in which coating film defects are prevented. A water-borne luster coating composition comprising a cellulose ester derivative, a cellulose nanofiber, and a scaly pigment, wherein an amount of a solid contained in the water-borne luster coating composition is 0.1% by mass or more and 12% by mass or less. A coated plate comprising an article to be coated and a luster coating film, wherein the luster coating film is formed of the water-borne luster coating composition.

12 Claims, 1 Drawing Sheet

WATER-BORNE LUSTER COATING COMPOSITION AND COATED PLATE

TECHNICAL FIELD

The present invention relates to a water-borne luster coating composition and a coated plate.

BACKGROUND

In recent years, coating films capable of imparting metallic luster to the appearance of automobiles have been proposed. For example, Patent Literature 1 discloses a luster coating material capable of forming a coating film superior in metallic or pearl luster.

CITATIONS LIST

Patent Literature

Patent Literature 1: WO 2021/002196 A

SUMMARY OF INVENTION

Technical Problems

However, when the coating material of Patent Literature 1 is used, appearance defects such as a frame and orange peel occur in a resulting coating film, and the design is easily deteriorated. A challenge of the present invention is to provide a water-borne luster coating composition and a coated plate which can exhibit a metallic design and in which coating film defects are prevented.

Solutions to Problems

In order to solve the above-described problems, the present invention provides the following embodiments.

[1]

A water-borne luster coating composition comprising:

a cellulose ester derivative;

a cellulose nanofiber; and a scaly pigment, wherein an amount of a solid contained in the water-borne luster coating composition is 0.1% by mass or more and 12% by mass or less.

[2]

The water-borne luster coating composition according to [1], wherein a ratio of a content $C_N$ of the cellulose nanofiber to a content $C_E$ of the cellulose ester derivative, $C_N/C_E$, is 0.03 or more and 1.0 or less.

[3]

The water-borne luster coating composition according to [1] or [2], wherein the cellulose ester derivative is a condensation reaction product of an oxo acid having a hydrocarbon group having 1 to 20 carbon atoms and cellulose.

[4]

The water-borne luster coating composition according to any one of [1] to [3], wherein the acid value of the cellulose ester derivative is 20 mg KOH/g or more.

[5]

The water-borne luster coating composition according to any one of [1] to [4], wherein a content $C_N$ of the cellulose nanofiber is 0.03% by mass or more and 1% by mass or less of the water-borne luster coating composition.

[6]

The water-borne luster coating composition according to any one of [1] to [5], wherein a content of the scaly pigment is 0.1% by mass or more and 1.5% by mass or less of the water-borne luster coating composition.

[7]

The water-borne luster coating composition according to any one of [1] to [6], wherein a content of the scaly pigment is 3% by mass or more and 50% by mass or less of a total solid content of the water-borne luster coating composition.

[8]

The water-borne luster coating composition according to any one of [1] to [7], wherein the scaly pigment comprises an aluminum particle, and the water-borne luster coating composition further comprises a phosphoric acid group-containing compound.

[9]

The water-borne luster coating composition according to [8], wherein the phosphoric acid group-containing compound contains at least one of an alkyl phosphate having an alkyl group with 4 to 30 carbon atoms and a phosphoric acid group-containing polymer having a phosphoric acid group value of 5 mg KOH/g or more and 300 mg KOH/g or less.

[10]

The water-borne luster coating composition according to [8] or [9], wherein a content of the phosphoric acid group-containing compound is 0.1% by mass or more and 15% by mass or less of a total solid content of the water-borne luster coating composition.

[11]

A coated plate comprising:

an article to be coated; and a luster coating film, wherein the luster coating film is formed of the water-borne luster coating composition according to any one of [1] to [10].

[12]

The coated plate according to [11], wherein a dry film thickness of the luster coating film is 5 μm or less.

Advantageous Effects of Invention

By the present invention, it is possible to provide a water-borne luster coating composition and a coated plate which can exhibit a metallic design and in which coating film defects are prevented.

DESCRIPTION OF EMBODIMENTS

Figure 1:
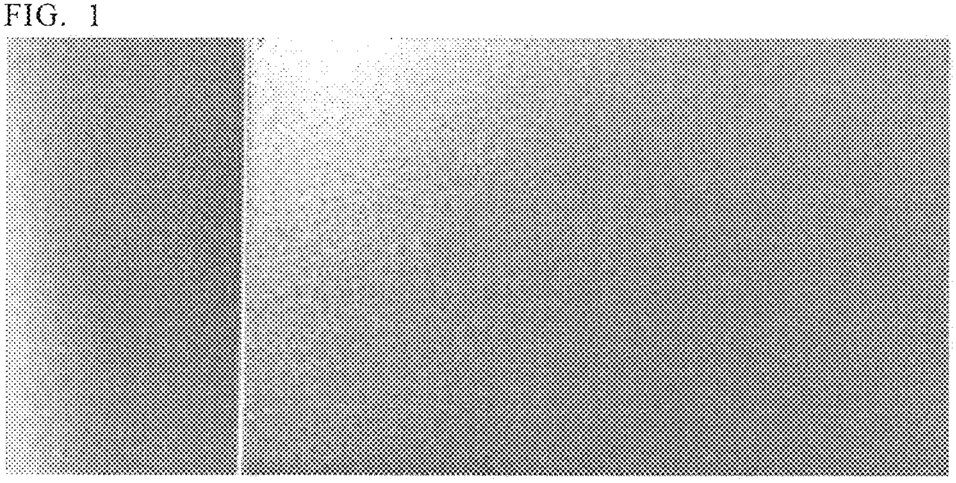
FIG. 1 is a front photograph of the coated plate prepared in Example 1.

In order to improve the metallic design, it is required to arrange the scaly pigment in parallel with a surface of the luster coating film. For this reason, the solid content of the coating material (luster coating material) for forming a luster coating film is desirably as small as possible. Therefore, in order to adjust the viscosity to a viscosity that allows use as a coating material, a cellulose nanofiber (hereinafter sometimes abbreviated as a CNF) is usually blended. A CNF can increase the viscosity of the coating material in a small amount. Further, a CNF can inhibit settling of the scaly pigment.

A CNF excessively aggregate a solid in a coating material. Therefore, in the process of applying and drying the coating material containing the CNF, the coating film may aggregate and coating film defects called orange peel or a frame phenomenon may occur.

When a cellulose ester derivative is blended together with a CNF, the occurrence of coating film defects is inhibited. Since the cellulose ester derivative tends to be unevenly distributed on the surface of a coating film, the surface viscosity of the luster coating film increases. As a result, the movement of the luster coating film and the entire multilayer coating film is restricted, so that the coating film defects as described above hardly occur. In addition, the cellulose ester derivative improves the arrangement property of the scaly pigment, so that the design is further improved.

[Water-Borne Luster Coating Composition]

The water-borne luster coating composition (hereinafter sometimes briefly referred to as a luster coating material) comprises a cellulose ester derivative, a cellulose nanofiber, and a scaly pigment. The luster coating material comprises various additives such as a surface conditioning agent, as necessary. When the scaly pigment comprises an aluminum particle, the luster coating material preferably further comprises a phosphoric acid group-containing compound. The luster coating material is prepared by diluting a mixture of the components described above with an aqueous solvent.

The amount of the solid contained in the luster coating material (the solid content of the luster coating material), is 0.1% by mass or more and 12% by mass or less. Owing to this, the scaly pigment is easily arranged at a high density along an article to be coated. The solid content of the luster coating material is preferably 0.5% by mass or more, more preferably 1% by mass or more, and particularly preferably 1.5% by mass or more. The solid content of the luster coating material is preferably 10% by mass or less, more preferably 8% by mass or less, and particularly preferably 5% by mass or less. The solid of the luster coating material refers to all components of the luster coating material excluding the aqueous solvent.

The viscosity of the luster coating material is not particularly limited. The viscosity of the luster coating material measured by a B-type viscometer at 20° C. is preferably 20 cps/6 rpm or more and 2,000 cps/6 rpm or less from the viewpoint of easily inhibiting the disturbance of the arrangement of the scaly pigment.

(Cellulose Nanofiber)

The cellulose nanofiber (CNF) is obtained by mechanically fibrillating a plant material as defined in ISO TS 20477. The CNF is a cellulose microfibril (single nanofiber) composed of a crystalline part, a paracrystalline part, and an amorphous part, or longitudinally torn cellulose microfibrils, entangled cellulose microfibrils, or an aggregate thereof having a network structure. The CNF also includes those referred to as cellulose nanofibril, fibrillated cellulose, nanocellulose crystal, and the like. Examples of the plant material mainly include wood. Examples of other plant materials include bamboo, rice straw, wheat straw, rice hulls, herbaceous plants (e.g., Japanese silver grass), and seaweed. As described later, the CNF has an aspect ratio of, for example, 10 or more and is fibrous. Therefore, the CNF is dispersed in the form of a network in the luster coating material to increase the viscosity of the coating material.

Prior to mechanical fibrillation, the plant material is usually subjected to chemical treatment. The shape of the plant material is not changed by the chemical treatment and remains fibrous. Through the chemical treatment, an anionic group, such as a carboxy group, a phosphoric acid group, a phosphorous acid group, a carboxymethyl group, or a sulfo group, is introduced into the resulting CNF. Examples of the chemical treatment include a TEMPO oxidation method in which a carboxy group is introduced by oxidation using 2,2,6,6-tetramethylpiperidine-1-oxyl (TEMPO), a phosphoric acid esterification method in which a phosphoric acid group is introduced, a phosphorous acid esterification method in which a phosphorous acid group is introduced, a carboxymethylation method in which a carboxymethyl group is introduced, and a sulfonation method in which a sulfo group is introduced. Depending on the type of the chemical treatment, the characteristics of the resulting CNF may vary. In the present embodiment, CNFs subjected to any chemical treatment can be used.

Among them, a CNF treated by the TEMPO oxidation method (hereinafter referred to as a TEMPO-oxidized type CNF) is preferable from the viewpoint of superior transparency. In particular, a CNF that has been subjected to acid treatment and then treated by the TEMPO oxidation method is preferred. The acid treatment is performed, for example, under conditions of a pH of 2 to 6 and a temperature of 30° C. or more and 120° C. or less. The acid may be either an inorganic acid or an organic acid.

The TEMPO-oxidized type CNF has carboxyl groups in an amount of, for example, 0.5 mmol/g or more and 2.5 mmol/g or less based on the absolute dry mass thereof. The amount of the carboxy groups may be 1.0 mmol/g or more, and is particularly preferably 1.3 mmol/g or more. The amount of the carboxy groups may be 2.0 mmol/g or less, and may be 1.6 mmol/g or less.

The amount of the carboxy groups is calculated, for example, by the following method. A 0.1 M aqueous hydrochloric acid solution is added to 60 mL of a 0.5% by mass slurry of a TEMPO-oxidized type CNF to adjust the pH to 2.5. Subsequently, a 0.05 N aqueous sodium hydroxide solution is added dropwise to the slurry, and the electrical conductivity until the pH reaches 11 is measured. The amount (a) of sodium hydroxide consumed in the neutralization stage with a weak acid under a slow change in electrical conductivity is identified. The amount of carboxy groups is calculated from the amount (a) of sodium hydroxide and the following formula.

Amount of carboxyl groups [mmol/g TEMPO-oxidized type CNF]=a [mL]×0.05/mass [g] of TEMPO-oxidized type CNF From the viewpoint of preventing the scaly pigment from settling, the average fiber width of the CNF is, for example, 1 nm or more and 300 nm or less. The average fiber width of the CNF may be 2 nm or more, and may be 3 nm or more. From the viewpoint of transparency, the average fiber width of the CNF may be 200 nm or less, 100 nm or less, or 90 nm or less.

From the viewpoint of preventing the scaly pigment from settling, the average fiber length of the CNF may be, for example, 0.1 μm or more and 200 μm or less. The average fiber length of the CNF may be 0.5 μm or more, 1 μm or more, or 2 μm or more. From the viewpoint of transparency, the average fiber length of the CNF may be 100 μm or less, or 90 μm or less.

The aspect ratio of the CNF may be, for example, 10 or more and 2,000 or less. The aspect ratio of the CNF may be 20 or more, 25 or more, or 100 or more. The aspect ratio of the CNF may be 2,000 or less, 1,000 or less, or 500 or less.

The average fiber width and the average fiber length can be calculated by measuring fiber diameters and fiber lengths of a sufficient number of fibers using an atomic force microscope (AFM) or a transmission electron microscope (TEM), and averaging the fiber diameters and the fiber lengths. The aspect ratio is a value obtained by dividing the average fiber length by the average fiber width (average fiber length/average fiber width).

The content $C_N$ of the CNF is preferably 0.03% by mass or more of the luster coating material. Owing to this, the above-described effect of the CNF is more easily exhibited. The content $C_N$ is preferably 1.0% by mass or less of the luster coating material. Owing to this, the occurrence of coating film defects is easily inhibited. The content $C_N$ is more preferably 0.06% by mass or more, and particularly preferably 0.1% by mass or more of the luster coating material. The content $C_N$ is preferably 0.6% by mass or less, and particularly preferably 0.3% by mass or less of the luster coating material. In one embodiment, the content $C_N$ is 0.03% by mass or more and 1.0% by mass or less of the luster coating material.

(Cellulose Ester Derivative)

The cellulose ester derivative is a condensation reaction product of an oxo acid (typically, a carboxylic acid) and cellulose ($(C_6H_{10}O_5)_n$). In the cellulose ester derivative, since the hydroxy group of cellulose is esterified, the balance between hydrophilicity and hydrophobicity is controlled. Further, the aspect ratio of the cellulose ester derivative is smaller than that of the CNF and is, for example, less than 10. Owing to this, the cellulose ester derivative exhibits a behavior different from that of the CNF in the luster coating material or the luster coating film.

The oxo acid (in other words, a group that forms an ester linkage with a hydroxy group of cellulose) preferably has a hydrocarbon group having 1 to 20 carbon atoms. A general structure of the cellulose ester derivative is shown in the following formula.

[Chemical Formula 1]

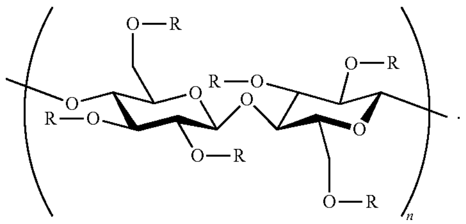

In the formula, R is each independently represent hydrogen (H), an acyl group (—C(═O)—$R^1$), a hydrocarbon group (—$R^1$), or a carboxyalkyl group (—$R^2$COOH), and at least one of them represents an acyl group. A plurality of $R^1$ and a plurality of $R^2$ each may be the same or different.

$R^1$ is, for example, a hydrocarbon group having 1 to 20 carbon atoms. The hydrocarbon group may be a chain, branched, or cyclic aliphatic hydrocarbon group, and may have an aromatic ring. In particular, $R^1$ is preferably a chain or branched aliphatic hydrocarbon group having 2 to 10 carbon atoms, more preferably 2 to 4 carbon atoms.

$R^2$ is, for example, an alkylene group having 1 to 20 carbon atoms. The alkylene group may be chain, branched, or cyclic. In particular, $R^2$ is preferably a chain or branched alkylene group having 2 to 10 carbon atoms, and more preferably 2 to 4 carbon atoms.

The acid value of the cellulose ester derivative is preferably 20 mg KOH/g or more. Owing to this, the cellulose ester derivative can stably exist in the water-borne coating material, and the effect thereof is easily exhibited. The acid value of the cellulose ester derivative is more preferably 40 mg KOH/g or more. The acid value of the cellulose ester derivative may be 150 mg KOH/g or less.

Examples of the cellulose ester derivative specifically include cellulose acetate, cellulose triacetate, cellulose acetate phthalate, cellulose acetate butyrate, cellulose butyrate, cellulose tributyrate, cellulose propionate, cellulose tripropionate, cellulose acetate propionate, carboxymethyl cellulose acetate, carboxymethyl cellulose acetate propionate, carboxymethyl cellulose acetate butyrate, cellulose acetate butyrate succinate, and cellulose propionate butyrate. These are used singly or two or more of them are used in combination. Among them, carboxymethylcellulose acetate butyrate is preferable.

The content of the cellulose ester derivative is preferably set according to the content of the CNF. The ratio of the content $C_N$ of the cellulose nanofiber to the content $C_E$ of the cellulose ester derivative, $C_N/C_E$, is preferably 0.03 or more. Owing to this, the effects of the CNF, namely, an increase in viscosity and prevention of the scaly pigment from settling are more easily exhibited. The ratio $C_N/C_E$ is more preferably 1.0 or less. Owing to this, the effect of the cellulose ester derivative, namely, inhibition of the occurrence of coating film defects is more easily exhibited. The ratio $C_N/C_E$ is more preferably 0.06 or more, and particularly preferably 0.1 or more. The ratio $C_N/C_E$ is more preferably 0.6 or less, and particularly preferably 0.3 or less. In one embodiment, the ratio $C_N/C_E$ is 0.03 or more and 1.0 or less. The content is calculated on the basis of the solid content.

(Scaly Pigment)

The scaly pigment is not particularly limited as long as it reflects light. The scaly pigment preferably has an aspect ratio of 2 or more from the viewpoint that the metallic texture is easily improved. The aspect ratio is a ratio of a major axis of one main face of the scaly pigment to a distance (thickness) between two main faces of the scaly pigment: major axis/thickness. The aspect ratio of the scaly pigment may be 10 or more and 1000 or less.

The major axis of the scaly pigment is not particularly limited. The major axis of the scaly pigment may be, for example, 1 μm or more and 80 μm or less. The major axis of the scaly pigment may be 3 μm or more. The major axis of the scaly pigment may be 50 μm or less. The major axis is calculated by observing a coating film formed of a luster coating material (namely, a luster coating film) with an electron microscope from a normal direction thereof. In the observation field of view, a region corresponding to the scaly pigment and other regions are binarized by image processing software. Next, 20 scaly pigments are arbitrarily selected, and their longest diameters are each measured. The average value of these measured values is the major axis of the scaly pigment.

The thickness of the scaly pigment is not particularly limited. The thickness of the scaly pigment may be, for example, 0.02 μm or more and 0.18 μm or less. The thickness of the scaly pigment may be 0.15 μm or less. The thickness may be calculated by observing a cross section of a luster coating film with an electron microscope. In the observation field of view, a region corresponding to the scaly pigment and other regions are binarized by image processing software. Next, 20 scaly pigments are arbitrarily selected, and the lengths of their thickest parts are each measured. The average value of these measured values is the thickness of the scaly pigment.

The average particle size of the scaly pigment is not particularly limited. The average particle size of the scaly pigment may be 2 μm or more and 50 μm or less from the viewpoint that the metallic texture is easily improved. The average particle size of the scaly pigment may be 5 μm or more. The average particle size of the scaly pigment may be 35 μm or less. The average particle size means a volume average particle size D50. The volume average particle size D50 can be measured using a laser Doppler type particle size analyzer ("MICROTRAC UPA150" manufactured by Nikkiso Co., Ltd.).

The content of the scaly pigment is preferably 0.1% by mass or more of the luster coating material from the viewpoint of designability. From the same point of view, the content of the scaly pigment is preferably 1.5% by mass or less of the luster coating material. The content of the scaly pigment is more preferably 0.15% by mass or more, and particularly preferably 0.2% by mass or more of the luster coating material. The content of the scaly pigment is more preferably 1% by mass or less, and particularly preferably 0.8% by mass or less. In one embodiment, the content of the scaly pigment is 0.1% by mass or more and 1.5% by mass or less. In particular, when the content $C_N$ of the cellulose nanofiber is 0.03% by mass or more and 1% by mass or less of the luster coating material and the content of the scaly pigment is 0.1% by mass or more and 1.5% by mass or less, the design can be further improved.

The content of the scaly pigment may be 3% by mass or more, 5% by mass or more, or 7% by mass or more of the total solid content of the luster coating material from the viewpoint of designability. The content of the scaly pigment is, for example, 50% by mass or less, may be 20% by mass or less, or may be 10% by mass or less of the total solid content of the luster coating material. In one embodiment, the content of the scaly pigment is 3% by mass or more and 50% by mass or less of the total solid content of the luster coating material.

The scaly pigment is not particularly limited. Examples of the scaly pigment include metal particles, metal-coated mica, metal-coated glass particles, and graphite. Examples of the metal particles specifically include particles of aluminum, copper, zinc, iron, iron phosphide, nickel, tin, aluminum oxide, and alloys containing these. These are used singly or two or more of them are used in combination. The scaly pigment may be colored. Among them, aluminum particles are preferable from the viewpoint that the metallic texture is easily improved.

(Phosphoric Acid Group-Containing Compound)

The luster coating material may further comprise a phosphoric acid group-containing compound. In particular, when the scaly pigment comprises aluminum particles, the luster coating material preferably comprises a phosphoric acid group-containing compound. The dispersibility of the aluminum particles in the water-borne coating material is improved by the phosphoric acid group-containing compound, and the arrangement property is more easily enhanced.

The content of the phosphoric acid group-containing compound is not particularly limited. The content of the phosphoric acid group-containing compound is preferably 0.1% by mass or more, and more preferably 1% by mass or more of the solid content of the luster coating material. The content of the phosphoric acid group-containing compound is preferably 15% by mass or less, and more preferably 12% by mass or less of the solid content of the luster coating material. In one embodiment, the content of the phosphoric acid group-containing compound is 0.1% by mass or more and 15% by mass or less of the total solid content of the luster coating material.

The phosphoric acid group-containing compound is not particularly limited as long as it has a phosphoric acid group ($-P(=O)OR^2$ (R is each independently hydrogen or a hydrocarbon group). The phosphoric acid group-containing compound is, for example, at least one of an alkyl phosphate having an alkyl group having 4 to 30 carbon atoms and a phosphoric acid group-containing polymer having a phosphoric acid group value of 5 mg KOH/g or more and 300 mg KOH/g or less.

<Alkyl Phosphate>

The alkyl phosphate has an alkyl group having 4 to 30 carbon atoms. Examples of the alkyl phosphate include a monoalkyl phosphate, a dialkyl phosphate, and mixtures thereof. In the dialkyl phosphate, the two alkyl groups may be the same or different. The dialkyl phosphate preferably has the same two alkyl groups.

Examples of the alkyl group having 4 to 30 carbon atoms include a butyl group, a pentyl group, a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group, an eicosyl group, a docosyl group, a tetracosyl group, a hexacosyl group, and an octacosyl group. The alkyl group may be linear or branched.

Examples of the alkyl phosphate include butyl acid phosphate (a mixture of monobutyl phosphate and dibutyl phosphate), 2-ethylhexyl acid phosphate (a mixture of mono-2-ethylhexyl phosphate and di-2-ethylhexyl phosphate), isodecyl acid phosphate (a mixture of monoisodecyl phosphate and diisodecyl phosphate), dilauryl acid phosphate, lauryl acid phosphate (a mixture of monolauryl phosphate and dilauryl phosphate), tridecyl acid phosphate (a mixture of monotridecyl phosphate and ditridecyl phosphate), monostearyl acid phosphate, distearyl acid phosphate, and stearyl acid phosphate (a mixture of monostearyl phosphate and distearyl phosphate), isostearyl acid phosphate (a mixture of monoisostearyl phosphate and diisostearyl phosphate), oleyl acid phosphate (a mixture of monooleyl phosphate and dioleyl phosphate), and behenyl acid phosphate (a mixture of monobehenyl phosphate and dibehenyl phosphate).

<Phosphoric Acid Group-Containing Polymer>

The phosphoric acid group-containing polymer has a phosphoric acid group value of 5 mg KOH/g or more and 300 mg KOH/g or less. When the phosphoric acid group value is within this range, the water resistance are likely to be improved together with the adhesion. The phosphoric acid group value of the phosphoric acid group-containing polymer is preferably 10 mg KOH/g or more, and more preferably 50 mg KOH/g or more. The phosphoric acid group value of the phosphoric acid group-containing polymer is preferably 250 mg KOH/g or less, and more preferably 150 mg KOH/g or less. In one embodiment, the phosphoric acid group-containing polymer has a phosphoric acid group value of 50 mg KOH/g or more and 300 mg KOH/g or less.

The phosphoric acid group value is calculated on the basis of the acid value measurement method of JIS K 5601 2-1. Specifically, the acid value is the number of mg of potassium hydroxide (KOH) required to neutralize the free acid in 1 g of the non-volatile of the product.

The number average molecular weight of the phosphoric acid group-containing polymer is, for example, 1,000 or more and 50,000 or less. The number average molecular weight of the phosphoric acid group-containing polymer is preferably 3,000 or more, and more preferably 5,000 or more. The number average molecular weight of the phosphoric acid group-containing polymer is preferably 30,000 or less, and more preferably 20,000 or less.

Examples of the phosphoric acid group-containing polymer include an acrylic resin, a polyester resin, a polyether resin, and an epoxy resin having a phosphoric acid group value of 5 mg KOH/g or more and 300 mg KOH/g or less. These are used singly or two or more of them are used in combination. Among them, a phosphoric acid group-containing acrylic resin is preferable from the viewpoint of water resistance. The phosphoric acid group-containing acrylic resin is obtained, for example, by polymerizing a phosphoric acid group-containing α,β-ethylenically unsaturated monomer or copolymerizing this monomer with another α,β-ethylenically unsaturated monomer containing no phosphoric acid group.

(Aqueous Solvent)

Examples of the aqueous solvent include various kinds of water such as pure water, ion-exchanged water, tap water, and industrial water. The amount of the aqueous solvent is not particularly limited, and is set such that the solid content of the luster coating material is 0.1% by mass or more and 12% by mass or less.

The luster coating material may comprise an organic solvent together with the aqueous solvent. Examples of the organic solvent include alkyl (or aromatic) alcohols such as n-butanol, n-hexyl alcohol, 2-ethylhexanol (2EHOH)), lauryl alcohol, phenol carbinol, and methylphenyl carbinol; cellosolves such as ethylene glycol monohexyl ether, ethylene glycol mono-2-ethylhexyl ether, and ethylene glycol monobutyl ether (butyl cellosolve); phenols such as para-t-butylphenol and cresol; and oximes such as dimethyl ketoxime, methyl ethyl ketoxime, methyl isobutyl ketoxime, methyl amyl ketoxime, and cyclohexanone oxime. Among them, alkyl alcohols and cellosolves are preferable.

(Surface Conditioning Agent)

The luster coating material may comprise a surface conditioning agent. Owing to this, the surface tension of the luster coating material is controlled, and the scaly pigment is more easily arranged in parallel with the luster coating film. In addition, wettability of the luster coating material to an uncured colored coating film is easily improved, and adhesion between layers is improved.

The surface conditioning agent is not particularly limited. Examples of the surface conditioning agent include silicone-based, acryl-based, vinyl-based, and fluorine-based surface conditioning agents. These are used singly or two or more of them are used in combination. Among them, a silicone-based surface conditioning agent is preferable from the viewpoint of designability, water resistance, and the like. Examples of the silicone-based surface conditioning agent include polydimethylsiloxane and modified silicone prepared by modifying polydimethylsiloxane. Examples of the modified silicone include a polyether-modified product, an acryl-modified product, and a polyester-modified product.

Examples of the commercially available surface conditioning agent include BYK series (manufactured by BYK Japan KK), TEGO series (manufactured by Evonik Industries AG), GLANOL series and POLYFLOW series (both manufactured by Kyoeisha Chemical Co., Ltd.), and DISPARLON series (manufactured by Kusumoto Chemicals, Ltd.).

The amount of the surface conditioning agent is not particularly limited. The amount of the surface conditioning agent is preferably 0.1% by mass or more, and more preferably 0.15% by mass or more of the luster coating material. The amount of the surface conditioning agent is preferably 10% by mass or less, more preferably 5% by mass or less, and particularly preferably 2% by mass or less of the luster coating material.

(Coating Film-Forming Resin)

The luster coating material may comprise a coating film-forming resin. From the viewpoint of designability, the content of the coating film-forming resin is desirably small. The content of the coating film-forming resin in the luster coating material is preferably 10% by mass or less, more preferably 5% by mass or less, and may be 0% by mass of the luster coating material.

Examples of the coating film-forming resin include an acrylic resin, a polyester resin, an epoxy resin, and a urethane resin. The luster coating material may comprise a resin containing a curable functional group as the coating film-forming resin and a curing agent corresponding to this resin. Examples thereof specifically include a combination of a hydroxy group-containing resin and at least one among an amino resin (melamine resin), a urea resin, a polyisocyanate compound, an epoxy group-containing compound, a carboxy group-containing compound, a carbodiimide group-containing compound, a hydrazide group-containing compound, and a semicarbazide group-containing compound. The polyisocyanate compound includes a blocked polyisocyanate compound in which an isocyanate group is blocked with a blocking agent. These are used singly or two or more of them are used in combination.

(Other Viscosity Agent)

The luster coating material may comprise a viscosity agent other than the cellulose ester derivative and the CNF as long as the effect of the present embodiment is not impaired. Examples of the viscosity agent include a hydrophobic associative viscosity agent, a polycarboxylic acid type viscosity agent, an amide-based viscosity agent, an inorganic mineral-based viscosity agent, a silica-based fine powder, a barium sulfate atomized powder, a polyamide-based viscosity agent, an organic resin fine particle viscosity agent, a diurea-based viscosity agent, and cellulose ether. These are used singly or two or more of them are used in combination.

Examples of the hydrophobic associative viscosity agent include a polyacrylic acid-based viscosity agent with a hydrophobic monomer copolymerized, a polyurethane-based viscosity agent having a hydrophobic chain in the molecule (urethane associative viscosity control agent), a urethane-urea-based viscosity agent with at least a part of the main chain being a hydrophobic urethane chain, an amide-urea-based viscosity agent with at least a part of the main chain being a hydrophobic amide chain, a polyvinyl alcohol-based viscosity agent, and a polyethylene oxide viscosity agent. Examples of the cellulose ether include carboxymethyl cellulose, methyl cellulose, hydroxyethyl cellulose, hydroxyethyl methyl cellulose, and hydroxypropyl methyl cellulose.

(Other Pigment)

The luster coating material may comprise other pigments other than the scaly pigment depending on the hiding property and the like. Examples of such other pigments include rust-proof pigments, coloring pigments, and extender pigments. However, from the viewpoint of the arrangement property of the scaly pigment, the content of other pigments is preferably 10% by mass or less, and preferably 5% by mass or less of the total of the entire scaly pigment and the other pigments.

Examples of the coloring pigment include organic coloring pigments such as azo chelate pigments, insoluble azo pigments, condensed azo pigments, diketopyrrolopyrrolebased pigments, benzimidazolone-based pigments, phthalocyanine-based pigments, indigo pigments, perinone-based pigments, perylene-based pigments, dioxane-based pigments, quinacridone-based pigments, isoindolinone-based pigments, and metal complex pigments; and inorganic coloring pigments such as chrome yellow, yellow iron oxide, red iron oxide, carbon black, and titanium dioxide. Examples of the extender pigment include calcium carbonate, barium sulfate, clay, and talc. These are used singly or two or more of them are used in combination.

(Others)

The luster coating material may comprise various additives, as necessary. Examples of such additives include a UV absorber, a light stabilizer, an antioxidant, an antifoaming agent, a dispersant, and a pinhole inhibitor.

[Coated Plate]

The coated plate according to the present embodiment includes an article to be coated and a luster coating film. The luster coating film is formed of the water-borne luster coating composition described above.

(Article to be Coated)

The material of the article to be coated is not particularly limited. Examples of the material of the article to be coated include metal, resin, and glass. The shape of the article to be coated is also not particularly limited. Examples of the article to be coated include bodies of automobiles such as passenger cars, trucks, motorcycles, and buses, and parts for automobile bodies.

Examples of the metal include iron, copper, aluminum, tin, zinc, and alloys thereof. The metallic article to be coated may have been subjected to surface treatment. Examples of the surface treatment include phosphate salt treatment, chromate treatment, zirconium chemical conversion treatment, and composite oxide treatment. The metallic article to be coated may have been further coated with an electrodeposition coating material after the surface treatment. The electrodeposition coating material may be of a cationic type or of an anionic type.

Examples of the resin include polypropylene resin, polycarbonate resin, urethane resin, polyester resin, polystyrene resin, ABS resin, vinyl chloride resin, and polyamide resin. The resin article to be coated preferably has been subjected to degreasing treatment. The resin article to be coated may have been further coated with a primer coating material after the degreasing treatment. The primer coating material is not particularly limited, and may be appropriately chosen according to the type of the coating material to be applied thereon.

(Luster Coating Film)

The luster coating film gives a metallic texture to an article to be coated. The thickness of the luster coating film is, for example, not less than 0.05 μm and not more than 5 μm. Owing to this, the arrangement property of the scaly pigment is easily improved, and a superior metallic design is more easily obtained. The thickness of the luster coating film may be 1.0 μm or less, may be 0.8 μm or less, and may be 0.7 μm or less. The thickness of the luster coating film may be 0.1 μm or more, and may be 0.3 μm or more.

(Colored Coating Film)

The coated plate desirably includes a colored coating film. The colored coating film is disposed between the article to be coated and the luster coating film or such that the colored coating film covers the luster coating film. The colored coating film hides the texture and color of the article to be coated and gives a desired color tone to the coated plate.

The colored coating film is formed of a colored coating material. The colored coating material comprises, for example, a hydroxy group-containing resin, a curing agent, and a coloring pigment. The colored coating material is prepared by diluting a mixture of the above-recited components with an aqueous solvent or an organic solvent. The colored coating material may be either a one-pack coating material or a multi-pack coating material such as a two-pack coating material.

The thickness of the colored coating film is not particularly limited. From the viewpoint of hiding property, the thickness of the colored coating film may be 5 μm or more and 50 μm or less. The thickness of the colored coating film may be 10 μm or more, and may be 20 μm or more. The thickness of the colored coating film may be 45 μm or less, and may be 40 μm or less.

(Clear Coating Film)

The coated plate desirably comprises a clear coating film covering the luster coating film. The clear coating film protects the luster coating film. The clear coating film is not particularly limited, and a conventionally known clear coating material can be used. The clear coating material may be a powder, a water-borne system, or a solvent-based system. The clear coating material may be either a one-pack coating material or a multi-pack coating material such as a two-pack coating material. The clear coating material may comprise a pigment as long as transparency is not impaired.

The thickness of the clear coating film is not particularly limited. The thickness of the clear coating film may be 10 μm or more and 50 μm or less from the viewpoint that the appearance is easily improved. The thickness of the clear coating film may be 15 μm or more. The thickness of the clear coating film may be 40 μm or less from the viewpoint that whiteness and the metallic texture are hardly impaired.

[Method for Manufacturing Coated Plate]

The coated plate is obtained through, for example, a step of applying a luster coating material to an article to be coated to form an uncured luster coating film, and a step of curing the uncured luster coating film.

A coated plate including a colored coating film, a luster coating film, and a clear coating film in this order is preferably manufactured by the following method. The coated plate can be manufactured by a method including a step of applying a colored coating material to an article to be coated to form an uncured colored coating film, a step of applying a luster coating material to the uncured colored coating film to form an uncured luster coating film, a step of applying a clear coating material to the uncured luster coating film to form an uncured clear coating film, and a step of curing the uncured colored coating film, the uncured luster coating film, and the uncured clear coating film to obtain a multilayer coating film.

(Applying Method)

The method of applying each coating material is not particularly limited. Examples of the applying method include air spray coating, airless spray coating, rotary atomization coating, and curtain coating. These methods may be combined with electrostatic coating. Among them, rotary atomization type electrostatic coating is preferable from the viewpoint of coating efficiency. For the rotary atomization type electrostatic coating, for example, a rotary atomization type electrostatic coating machine commonly called "micro bell (μμ bell)", "micro bell (μ bell)", "metallic bell", or the like is used.

At every time when the application of a coating material is completed, preliminary drying (also referred to as preheating) may be carried out. Owing to this, the solvent contained in the coating films is inhibited from bumping during the curing step, so that the occurrence of bubbles is easily prevented. Further, the preliminary drying inhibits the uncured coating films from mixing together, so that it becomes difficult to form a mixed phase. Therefore, the appearance of a resulting coated plate is likely to be improved.

Conditions for the preliminary drying are not particularly limited. Examples of the preliminary drying include a method in which the item to be dried is left standing for 15 minutes or more and 30 minutes or less under a temperature condition of 20° C. or more and 25° C. or less, and a method in which the item to be dried is heated for 30 seconds or more and 10 minutes or less under a temperature condition of 50° C. or more and 100° C. or less.

(Curing)

Each coating film can be cured by heating. The heating conditions are appropriately set according to the composition and the like of the respective coating films. The heating temperature is, for example, 70° C. or more and 150° C. or less, and may be 80° C. or more and 140° C. or less. The heating time is, for example, 10 minutes or more and 40 minutes or less, and may be 20 minutes or more and 30 minutes or less. Examples of a heating device include drying furnaces such as a hot air oven, an electric oven, and an infrared induction heating oven.

EXAMPLES

In the following, the present invention will be described more specifically with reference to Examples and Comparative Examples. The present invention is not limited only to the Examples. Both "part" and "%" are on a mass basis. The blending amounts given in the table are solid contents.

Example 1

A luster coating material and a coated plate including a multilayer coating film were prepared as follows. The luster coating material and the coated plate obtained were evaluated as follows. The results are shown in Table 1. FIG. 1 shows a front photograph of the coated plate prepared in Example 1.

(I) Preparation of Article to be Coated

A zinc phosphate-treated steel sheet including a cured electrodeposition coating film was prepared as an article to be coated. The cured electrodeposition coating film was formed by electrodeposition coating a zinc phosphate-treated steel sheet with "POWERNICS", which is a cationic electrodeposition coating composition manufactured by Nippon Paint Co., Ltd., such that the dry film thickness was 20 μm, and then heating it at 160° C. for 30 minutes.

(II) Preparation of Coating Material (II-1) Preparation of Colored Coating Material The white pigment dispersion paste (130.5 parts), 73.9 parts of the hydroxy group-containing acrylic resin emulsion (30 parts in terms of resin solid content), and 60 parts of the hydroxy group-containing polyester resin (30 parts in terms of resin solid content), which had been prepared as described below, 100 parts of a hydroxy group-containing polyurethane resin (manufactured by Nippon Paint Automotive Coatings Co., Ltd.) (20 parts in terms of resin solid content), and 22.2 parts of CYMEL 327 (melamine resin manufactured by Allnex) as a curing agent were mixed. Then, 40 parts of ion-exchanged water was added to the mixture and further mixed. Subsequently, 3.3 parts of Viscalex HV-30 (polycarboxylic acid-based viscosity agent manufactured by BASF, nonvolatile content: 30%) as a viscosity agent was added to the mixture, and the resulting mixture was further mixed and stirred, affording a colored coating material.

(Production of White Pigment Dispersion Paste)

After preliminarily mixing 4.5 parts of Disperbyk 190 (nonionic and anionic dispersant manufactured by BYK-Chemie) as a dispersant, 0.5 parts of BYK-011 (manufactured by BYK-Chemie) as an antifoaming agent, 22.9 parts of ion-exchanged water, and 72.1 parts of titanium dioxide, a glass bead medium was added into a paint conditioner, and mixed at room temperature until the secondary particle size of the titanium dioxide reached 5 μm or less, and thus a pigment dispersion paste was obtained.

(Production of Hydroxy Group-Containing Acrylic Resin Emulsion)

A reaction vessel for the conventional production of an acrylic resin emulsion equipped with a stirrer, a thermometer, a dropping funnel, a reflux condenser, a nitrogen inlet tube, etc., is charged with 445 parts of water and 5 parts of NEWCOL 293 (manufactured by Nippon Nyukazai Co., Ltd.), which were then heated to 75° C. with stirring. A mixture of a monomer mixture containing 145 parts of methyl methacrylate, 50 parts of styrene, 220 parts of ethyl acrylate, 70 parts of 2-hydroxyethyl methacrylate, and 15 parts of methacrylic acid, 240 parts of water, and 30 parts of NEWCOL 293 was emulsified with a homogenizer, and thus a monomer pre-emulsified solution was obtained. The monomer pre-emulsified solution was added dropwise over 3 hours while stirring the inside of the reaction vessel. In parallel with the dropping of the monomer pre-emulsified solution, a aqueous solution prepared by dissolving 1 part of APS (ammonium persulfate) as a polymerization initiator in 50 parts of water was evenly dropped to the reaction vessel until the dropping of the monomer pre-emulsion was completed. After the completion of dropping the monomer pre-emulsified solution, the reaction was continued at 80° ° C. for 1 hour. After cooling the reaction mixture, an aqueous solution prepared by dissolving 2 parts of dimethylaminoethanol in 20 parts of water was added to the reaction vessel, affording a hydroxy group-containing acrylic resin emulsion having a solid content of 40.6% by mass.

(Production of Hydroxy Group-Containing Polyester Resin)

To a reactor, 25.6 parts of isophthalic acid, 22.8 parts of phthalic anhydride, 5.6 parts of adipic acid, 19.3 parts of trimethylolpropane, 26.7 parts of neopentyl glycol, 17.5 parts of ε-caprolactone, and 0.1 parts of dibutyltin oxide were added and then heated to 170° C. with mixing and stirring. Thereafter, while the reaction mixture was heated to 220° C. over 3 hours, the water produced by the condensation reaction was removed until the acid value reached 8. Next, 7.9 parts of trimellitic anhydride was added to the reactor and reacted at 150° C. for 1 hour, affording a polyester resin having an acid value of 40. Further, the polyester resin was cooled to 100° C., and then 11.2 parts of butyl cellosolve was added, and the mixture was stirred until uniform. Subsequently, the polyester resin was cooled to 60° C., and then 98.8 parts of ion-exchanged water and 5.9 parts of dimethylethanolamine were added. As a result, a hydroxy group-containing polyester resin having a solid content of 50% by mass was obtained.

(II-2) Preparation of Luster Coating Material

A luster coating material was prepared according to the components and blending proportions given in Table 1. The luster coating material had a viscosity of 400 mPa's as measured with a B-type viscometer (manufactured by Toki Sangyo Co., Ltd., model TVB10, single cylindrical rotary viscometer) under the conditions of a coating temperature of 20° C. and 60 rpm, and had a solid content of about 4.1% by mass.

The phosphoric acid group-containing polymer (phosphoric acid group-containing compound) and the hydroxy group-containing acrylic resin emulsion (coating film-forming resin) given in Table 1 were produced as follows. CYMEL 327 (manufactured by Allnex, curing agent) was used as a melamine resin (coating film-forming resin). The solid content ratio of the hydroxy group-containing acrylic resin emulsion to the melamine resin, hydroxy group-containing acrylic resin emulsion/melamine resin, is 7/3.

(Production of Phosphoric Acid Group-Containing Polymer)

In a reaction vessel, 40 parts by mass of ethoxypropanol was charged, into which a monomer solution (121.7 parts by mass) composed of 4 parts by mass of styrene, 35.96 parts by mass of n-butyl acrylate, 18.45 parts by mass of ethylhexyl methacrylate, 13.92 parts by mass of 2-hydroxyethyl methacrylate, 7.67 parts by mass of methacrylic acid, 20 parts by mass of acid phosphooxyhexa(oxypropylene) monomethacrylate ("PHOSMER PP" manufactured by Uni-Chemical Co., Ltd.), 20 parts by mass of ethoxypropanol, and 1.7 parts by mass of azobisisobutyronitrile was dropped at 120° ° C. over 3 hours, followed by continuous stirring at the same temperature for 1 hour. Thus, a liquid containing a phosphoric acid group-containing polymer (phosphoric acid group-containing acrylic resin) was obtained (nonvolatile content: 63% by mass). The phosphoric acid group-containing polymer obtained had a number average molecular weight of 6,000, a phosphoric acid group value of 55 mg KOH/g, and a hydroxyl value of 60 mg KOH/g.

(Production of Hydroxy Group-Containing Acrylic Resin Emulsion)

A reaction vessel was charged with 330 g of deionized water, and the temperature was raised to 80° ° C. with mixing and stirring in a nitrogen stream. Then, a 3% portion of a monomer emulsion composed of 11.25 parts of acrylic acid, 139 parts of n-butyl acrylate, 75 parts of methyl methacrylate, 187 parts of n-butyl methacrylate, 75 parts of 2-ethylhexyl methacrylate, 150 parts of 2-hydroxyethyl methacrylate, 112 parts of styrene, 11.2 parts of THIOCALCOL 20 (n-dodecylmercaptan, manufactured by Kao Corporation, active component content: 100%), 74.3 parts of LATEMUR PD-104 (emulsifier, manufactured by Kao Corporation, active component content: 20%), and 300 parts of deionized water, and a 30% portion of an initiator solution composed of 2.63 parts of ammonium persulfate and 90 parts of deionized water were added dropwise to the reaction vessel in parallel over 15 minutes. After the completion of the addition, aging was carried out at that temperature for 15 minutes. Furthermore, the remainders of the monomer emulsion and the initiator solution were added dropwise to the reaction vessel in parallel over 180 minutes. After the completion of the dropping, aging was carried out at the same temperature for 1 hour. Then, the mixture was cooled to 40° ° C. and was filtered through a 200 mesh filter, affording a hydroxy group-containing acrylic resin emulsion having an average particle size of 200 nm, a nonvolatile content of 49%, a solid acid value of 15 mg KOH/g, and a hydroxyl value of 85 mg KOH/g.

(II-3) Preparation of Clear Coating Material PU EXCEL O-2100 (two-pack clear coating material manufactured by Nippon Paint Co., Ltd.) was prepared as a clear coating material.

(III) Step of Forming Uncured Colored Coating Film

The colored coating material was applied to an article to be coated using a metallic bell.

(IV) Step of Forming Uncured Luster Coating Film

The luster coating material was applied to the uncured colored coating film using a metallic bell.

(V) Step of Forming Uncured Clear Coating Film

The clear coating material was applied to the uncured luster coating film using a micro micro bell.

(VI) Curing Step

After the step (V) of forming a clear coating film, the resultant was heated at 140° C. for 20 minutes, affording a coated plate having a multilayer coating film. The colored coating film had a thickness of 30 μm. The luster coating film had a thickness of 0.5 μm. The clear coating film had a thickness of 30 μm.

Examples 2 to 8, Comparative Examples 1 to 5

Figure 2:
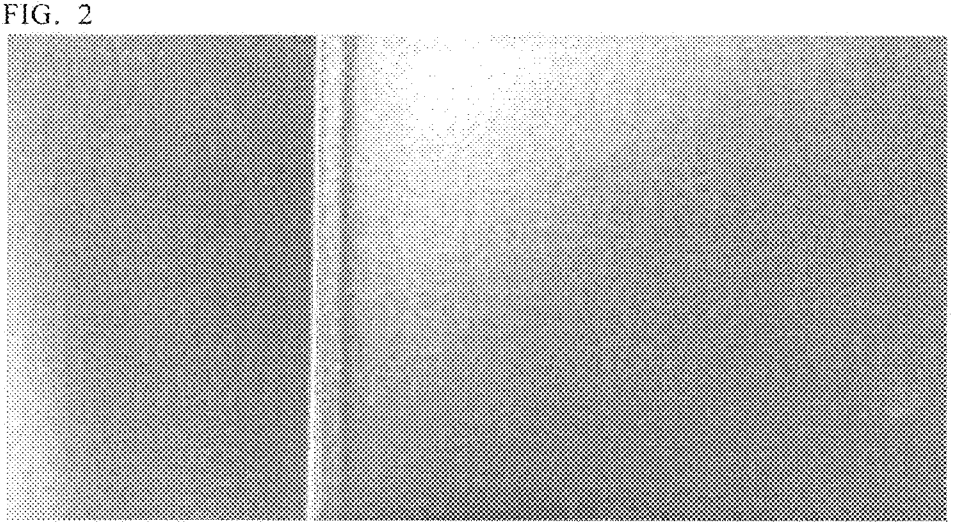
FIG. 2 is a front photograph of the coated plate prepared in Comparative Example 1.

A coated plate having a multilayer coating film was prepared and evaluated in the same manner as in Example 1 except that a luster coating material was prepared according to the components and blending proportions given in Table 1. The results are shown in Table 1. FIG. 2 shows a front photograph of the coated plate prepared in Comparative Example 1.

[Evaluation]

(1) Appearance

Presence or absence of a frame phenomenon, cracking, sagging, and orange peel of each coated plate was comprehensively evaluated visually. Evaluation criteria are as follows.

Good: No defect is observed.

Fair: Only orange peel is confirmed.

Poor: At least one defect among frame phenomenon, cracking and sagging is observed.

(2) Design

Using a multi-angle spectrophotometer MA-68 (manufactured by X-Rite Inc.), the spectral reflectance of light irradiated from an angle of 45 degrees with respect to a multilayer coating film was measured at a light receiving angle of 15 degrees with respect to regular reflected light. Next, the lightness L* (L value) in the L*a*b* color system (CIE1976 L*a*b* color space) calculated from the spectral reflectance was calculated. The larger the L value, the better in metallic tone the sample. The L value calculated was evaluated according to the following criteria. The L value of the article to be coated after the formation of the cured colored coating film and before the application of the luster coating material was 90.

Good: 100 or more

Fair: 85 or more and less than 100

Poor: less than 85

(3) Settling Property

The luster coating material was placed in a glass container, sealed, and left at rest at 20° C. for 10 days. Thereafter, the state of the coating material was visually evaluated. Evaluation criteria are as follows.

Good: Settling of the scaly pigment is not observed.

Fair: Settling of the scaly pigment is observed within 7 days after leaving the coating material at rest.

Poor: Settling of the scaly pigment is observed within 1 day after leaving the coating material at rest.

The components used in the examples and the comparative examples are as follows.

(Scaly Pigment)

Aluminum particle: Trade name: SB-10, manufactured by Asahi Kasei Corp., thickness: 0.06 μm, average particle size: 10 μm Metal-coated mica: XIRALLIC T60-10WNT Crystal Silver, manufactured by Merck & Co., Inc., average particle size: 17 μm (Cellulose Nanofiber)

TEMPO-oxidized type CNF, average fiber width: 2 to 4 nm, carboxy group amount: 1.4 mmol/g (Cellulose Ester Derivative)

Carboxymethyl cellulose acetate butyrate (CAB), trade name: SOLUS 3050, acid value: 50 mg KOH/g, manufactured by Eastman Chemical Company (Other Viscosity Agent)

Viscosity agent 1: Hydrophobic associative viscosity agent, ADEKA NOL UH540 (urethane associative viscosity control agent, manufactured by ADEKA Corporation)

Viscosity agent 2: Polycarboxylic acid type viscosity agent, SN THICKENER 640 (polycarboxylic acid viscosity agent, manufactured by San Nopco Ltd.)

Viscosity agent 3: Amide-based viscosity agent, DISPARLON 6700 (polyamide viscosity agent, manufactured by Kusumoto Chemicals, Ltd.)

Viscosity agent 4: Inorganic mineral-based viscosity agent, LAPONITE RD (lithium magnesium sodium silicate, manufactured by BYK)

TABLE 1

| | | | Example 1 | Example 2 | Example 3 | Example 4 | Example 5 | Example 6 | Example 7 |
|---|---|---|---|---|---|---|---|---|---|
| Coating material composition | Cellulose nanofiber | TEMPO-oxidized type CNF | 0.2 | 0.06 | 0.6 | 0.2 | 0.2 | 0.2 | 0.2 |
| | Cellulose ester derivative | CAB | 1.0 | 1.0 | 1.0 | 1.0 | 1.0 | 1.0 | 1.0 |
| | Viscosity agent 1 | Hydrophobic associative viscosity agent | — | — | — | — | — | — | — |
| | Viscosity agent 2 | Polycarboxylic acid type viscosity agent | — | — | — | — | — | — | — |
| | Viscosity agent 3 | Amide-based viscosity agent | — | — | — | — | — | — | — |
| | Viscosity agent 4 | Inorganic mineral-based viscosity agent | — | — | — | — | — | — | — |
| | Phosphoric acid group-containing polymer | Phosphoric acid group value 55 mg KOH/g | 0.2 | 0.2 | 0.2 | 0.2 | 0.2 | 0.32 | 0 |
| | Coating film-forming resin | Hydroxy group-containing acrylic resin emulsion/ melamine resin | 2.0 | 2.0 | 2.0 | 0 | 8.0 | 2.0 | 2.0 |
| | Scaly pigment | Aluminum | 0.3 | 0.3 | 0.34 | 0.15 | 0.75 | 0.32 | — |
| | | Mica | — | — | — | — | — | — | 0.3 |
| | Other additives | Surface conditioning agent | 0.2 | 0.2 | 0.2 | 0.2 | 0.2 | 0.2 | 0.2 |
| | | UV absorber | 0.1 | 0.1 | 0.1 | 0.1 | 0.1 | 0.1 | 0.1 |
| | | Light stabilizer | 0.1 | 0.1 | 0.1 | 0.1 | 0.1 | 0.1 | 0.1 |
| | Organic solvent | | 20.9 | 20.9 | 20.9 | 20.9 | 20.9 | 20.9 | 20.9 |
| | Distilled water | | 75 | 75 | 75 | 75 | 75 | 75 | 75 |
| | Coating material solid content (%) | | 4.10 | 3.97 | 4.52 | 1.99 | 9.91 | 4.23 | 3.91 |
| Evaluation | Appearance | | Good | Good | Good | Good | Good | Good | Good |
| | Design | | Good | Good | Good | Good | Good | Good | Good |
| | Settling property | | Good | Fair | Good | Good | Good | Good | Good |

| | | | Example 8 | Example 1 Comparative | Example 2 Comparative | Example 3 Comparative | Comparative Example 4 | Comparative Example 5 |
|---|---|---|---|---|---|---|---|---|
| Coating material composition | Cellulose nanofiber | TEMPO-oxidized type CNF | 0.06 | 0.2 | 0.2 | 0.2 | 0.2 | 0 |
| | Cellulose ester derivative | CAB | 0.3 | — | — | — | — | 1.0 |
| | Viscosity agent 1 | Hydrophobic associative viscosity agent | — | 1.0 | — | — | — | — |
| | Viscosity agent 2 | Polycarboxylic acid type viscosity agent | — | — | 1.0 | — | — | — |
| | Viscosity agent 3 | Amide-based viscosity agent | — | — | — | 1.0 | — | — |
| | Viscosity agent 4 | Inorganic mineral-based viscosity agent | — | — | — | — | 1.0 | — |
| | Phosphoric acid group-containing polymer | Phosphoric acid group value 55 mg KOH/g | 0.2 | 0.2 | 0.2 | 0.2 | 0.2 | 0.2 |
| | Coating film-forming resin | Hydroxy group-containing acrylic resin emulsion/ melamine resin | 8.0 | 2.0 | 2.0 | 2.0 | 2.0 | 2.0 |
| | Scaly pigment | Aluminum | 0.75 | 0.3 | 0.3 | 0.3 | 0.3 | 0.3 |
| | | Mica | — | — | — | — | — | — |
| | Other additives | Surface conditioning agent | 0.2 | 0.2 | 0.2 | 0.2 | 0.2 | 0.2 |

TABLE 1-continued

| | | | | | | | |
|---|---|---|---|---|---|---|---|
| | | UV absorber | 0.1 | 0.1 | 0.1 | 0.1 | 0.1 | 0.1 |
| | | Light stabilizer | 0.1 | 0.1 | 0.1 | 0.1 | 0.1 | 0.1 |
| | Organic solvent | | 20.9 | 20.9 | 20.9 | 20.9 | 20.9 | 20.9 |
| | Distilled water | | 75 | 75 | 75 | 75 | 75 | 75 |
| | Coating material solid content (%) | | 9.19 | 4.10 | 4.10 | 4.10 | 4.10 | 3.91 |
| Evaluation | Appearance | | Good | Poor | Poor | Poor | Poor | Good |
| | Design | | Good | Fair | Fair | Fair | Fair | Good |
| | Settling property | | Fair | Good | Good | Good | Good | Poor |

INDUSTRIAL APPLICABILITY

The water-borne luster coating composition of the present invention is particularly suitable for coating of an exterior plate of an automobile body because a coating film having no coating film defects and having a metallic design can be obtained therefrom.

This application claims priority based on Japanese Patent Application No. 2021-106997, which was filed in Japan on Jun. 28, 2021, the disclosure of which application is incorporated herein by reference in its entirety.

The invention claimed is:

1. A water-borne luster coating composition comprising:

a cellulose ester derivative;

a cellulose nanofiber; and a scaly pigment, wherein an amount of a solid contained in the water-borne luster coating composition is 0.1% by mass or more and 12% by mass or less.

2. The water-borne luster coating composition according to claim 1, wherein a ratio of a content $C_N$ of the cellulose nanofiber to a content $C_E$ of the cellulose ester derivative, $C_N/C_E$, is 0.03 or more and 1.0 or less.

3. The water-borne luster coating composition according to claim 1, wherein the cellulose ester derivative is a condensation reaction product of an oxo acid having a hydrocarbon group having 1 to 20 carbon atoms and cellulose.

4. The water-borne luster coating composition according to claim 1, wherein the acid value of the cellulose ester derivative is 20 mg KOH/g or more.

5. The water-borne luster coating composition according to claim 1, wherein a content $C_N$ of the cellulose nanofiber is 0.03% by mass or more and 1% by mass or less of the water-borne luster coating composition.

6. The water-borne luster coating composition according to claim 1, wherein a content of the scaly pigment is 0.1% by mass or more and 1.5% by mass or less of the water-borne luster coating composition.

7. The water-borne luster coating composition according to claim 1, wherein a content of the scaly pigment is 3% by mass or more and 50% by mass or less of a total solid content of the water-borne luster coating composition.

8. The water-borne luster coating composition according to claim 1, wherein the scaly pigment comprises an aluminum particle, and the water-borne luster coating composition further comprises a phosphoric acid group-containing compound.

9. The water-borne luster coating composition according to claim 8, wherein the phosphoric acid group-containing compound contains at least one of an alkyl phosphate having an alkyl group with 4 to 30 carbon atoms and a phosphoric acid group-containing polymer having a phosphoric acid group value of 5 mg KOH/g or more and 300 mg KOH/g or less.

10. The water-borne luster coating composition according to claim 8, wherein a content of the phosphoric acid group-containing compound is 0.1% by mass or more and 15% by mass or less of a total solid content of the water-borne luster coating composition.

11. A coated plate comprising:

an article to be coated; and a luster coating film, wherein the luster coating film is formed of the water-borne luster coating composition according to claim 1.

12. The coated plate according to claim 11, wherein a dry film thickness of the luster coating film is 5 μm or less.

* * * * *